United States Patent
Douglas

[15] 3,651,376
[45] Mar. 21, 1972

[54] GROUND FAULT PROTECTION WITH A SATURABLE MAGNETIC CORE
[72] Inventor: Ellwood S. Douglas, Orinda, Calif.
[73] Assignee: The Rucker Company, Oakland, Calif.
[22] Filed: Aug. 20, 1970
[21] Appl. No.: 65,640

[52] U.S. Cl. ..................317/18 D, 317/27 R, 323/85, 323/89 P
[51] Int. Cl. ..................................................H02h 3/28
[58] Field of Search...............323/89 P, 85; 317/33 C, 151, 317/33 SC, 18 D, 27 R, 49; 307/131; 340/253, 255, 253 A, 253 H, 253 N, 253 QY

[56] References Cited

UNITED STATES PATENTS

| 2,594,372 | 4/1952 | Wattenberger | 317/27 X |
| 3,308,345 | 3/1967 | Warrington | 317/18 R |
| 3,504,234 | 3/1970 | Fitzgerald | 317/27 R |
| 3,512,045 | 5/1970 | Tipton et al. | 317/27 R X |

*Primary Examiner*—James D. Trammell
*Attorney*—Flehr, Hohbach, Test, Albritton & Herbert

[57] ABSTRACT

Ground fault protective system utilizing a saturable magnetic core for limiting the level of signals produced by fault currents.

12 Claims, 3 Drawing Figures

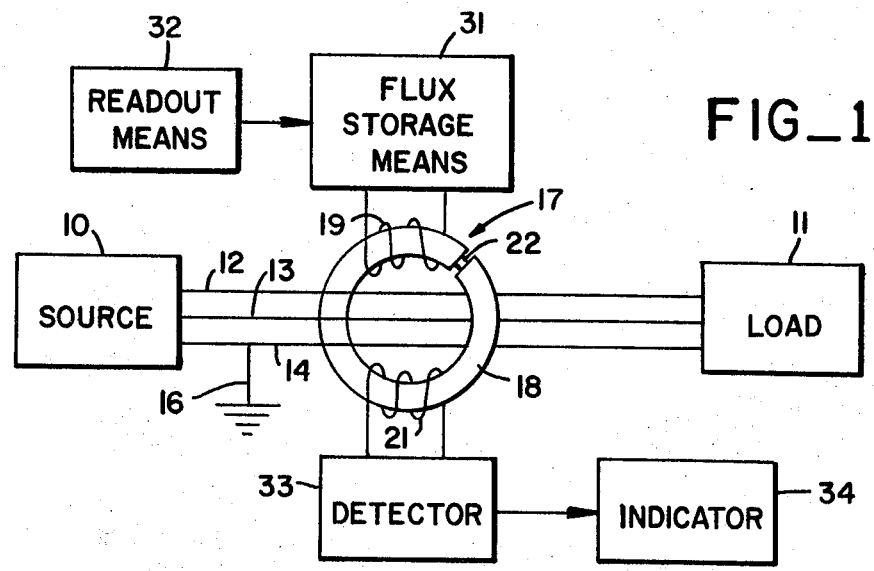
FIG_1
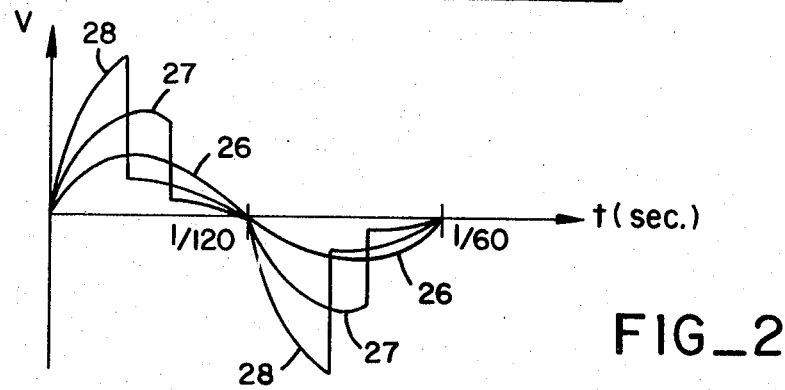
FIG_2
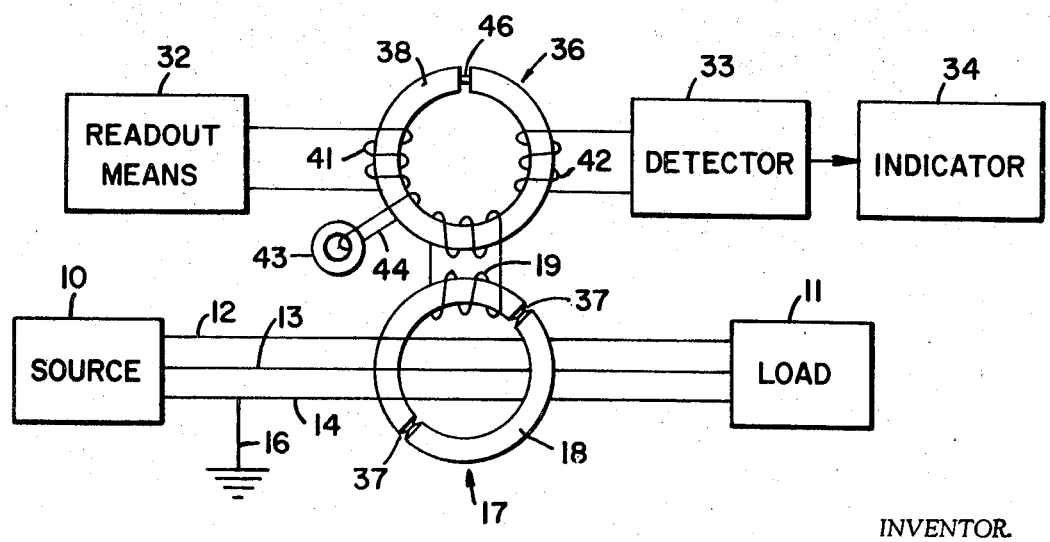
FIG_3
INVENTOR.
ELLWOOD S. DOUGLAS
BY Flehr, Hohbach, Test, Albritton & Herbert
ATTORNEYS

GROUND FAULT PROTECTION WITH A SATURABLE MAGNETIC CORE

BACKGROUND OF THE INVENTION

This invention pertains generally to electrical safety devices and more particularly to ground fault detectors and current interrupters.

Heretofore, various types of ground fault detectors and current interrupters have been provided for protecting human life and property against electrical shock and damage resulting from leakage currents to ground and contact with the conductors of a power distribution system having a grounded circuit conductor. These devices typically include some means for monitoring the flow of current in the conductors and either giving a warning or interrupting the current when the flow of current toward the load is not equal to the flow of current back toward the source through the conductors.

In certain types of ground fault protective systems, a problem exists since the systems are rendered inoperable by fault currents in excess of a predetermined level. This problem is particularly troublesome with ground fault protectors of the flux storage type, disclosed in copending application Ser. No. 18,158, now abandoned filed Mar. 10, 1970 and assigned to the assignee of the present invention. In this type of system, the fault signals are stored in memory cores in the form of magnetic flux signals. The stored flux signals are read out of the cores by means of a drive current which is applied periodically to the cores. The readout signals are then applied to a detector and/or amplifier for conditioning to operate an indicator and/or interrupter. In order for this type of system to function properly, the drive current must be substantially greater than any fault current which is present at the time the drive current is applied. If the fault current is larger than the drive current, there can be no readout from the memory cores. With fault currents of sufficient magnitude, the system may operate in a direct mode, that is the fault current may pass directly to the detector and/or amplifier stages. This is possible because these stages are generally connected to the ground fault sensor through one or more coupling transformers. It is possible to overcome the problem to a certain extent by selecting the components used in the system so that direct operation begins at a lower fault current than that for which flux storage operation fails. However, with this approach, it is necessary to use a higher drive current than is generally desirable.

There is, therefore, a need for a new and improved system which overcomes the foregoing and other problems encountered with the ground fault protective systems heretofore provided.

SUMMARY AND OBJECTS OF THE INVENTION

In the ground fault protective system of the present invention, a saturable magnetic core is used for limiting the level of fault signals produced by a ground fault sensor. In one embodiment, the ground fault sensor comprises a differential transformer having a magnetic core formed to include at least one region of reduced cross-sectional area which limits the saturation level of the transformer core and, hence, the level of the voltage produced by a fault current. Additional limiting of the fault signal is provided by coupling additional saturable cores between the differential transformer and the memory cores of a flux storage system.

It is, in general, an object of the present invention to provide a new and improved ground fault protective device.

Another object of the invention is to provide a ground fault protective device of the above character which includes means for limiting the level of the fault current.

Another object of the invention is to provide a ground fault protective device of the above character which utilizes saturable magnetic cores.

Additional objects and features of the invention will be apparent from the following description in which the presently preferred embodiments are set forth in detail in conjunction with the accompanying drawings.

BRIEF DESCRIPTION OF THE DRAWINGS

FIG. 1 is a block diagram of one embodiment of a ground fault protective device incorporating the present invention.

FIG. 2 is a graphic representation of the action of a saturable magnetic core in limiting the level of the fault signal.

FIG. 3 is a block diagram of another embodiment of a ground fault protective device incorporating the present invention.

DESCRIPTION OF THE PREFERRED EMBODIMENTS

The preferred embodiments of the invention are illustrated in connection with a conventional single phase, three-wire, 60 hertz alternating current power distribution system. This system includes a source 10, a load 11, and conductors 12–14 interconnecting the source and the load. The conductor 14 is connected to ground at the source, as indicated at 16. It is to be understood, however, that the invention can be utilized with either single phase or polyphase distribution systems having any number of conductors, provided that a low impedance connection is made between one of the conductors and ground at the source.

In the embodiment illustrated in FIG. 1, a differential transformer 17 is provided for monitoring the flow of current in the distribution system conductors. This transformer includes a toroidal core 18 fabricated of a material having a high magnetic permeability. The conductors 12–14 pass through the opening in this core to form primary windings of at least one turn. The differential transformer also includes a secondary winding 19 and a tertiary winding 21 each comprising a plurality of turns wound upon the core 18. If desired, the secondary and tertiary windings can be replaced with a single winding which serves the functions of both. This core has a substantially uniform cross-sectional area throughout its length with the exception of a region 22 of reduced cross-sectional area. This region is formed by an annular groove extending around the small perimeter of the toroidal core. Since the saturation level of the core is determined by the minimum cross-sectional area, whereas the permeability and inductance are dependent upon the average cross-sectional area. This reduced area appreciably lowers the saturation level without significantly affecting the inductance and permeability of the core.

By limiting the saturation level of the core, the region of reduced area limits the level of the signal induced in the secondary winding 19 by an imbalance in the currents in the conductors 12–14. FIG. 2 illustrates the effect of core saturation upon the voltage induced in the secondary winding 19 by various levels of fault current. The curve 26 illustrates the output voltage obtained with a fault current having a magnitude smaller than that which produces saturation of the core. This voltage is sinusoidal and has a frequency of 60 hertz, corresponding to the frequency of the current in the distribution system. The curve 27 illustrates the output voltage produced by a fault current of sufficient magnitude to cause saturation of the core. This voltage follows a sinusoidal path at the beginning of each half cycle. When the core becomes saturated however, this voltage drops by a factor on the order of 1 to 3 orders of magnitude. Having dropped, the voltage remains at its reduced level throughout the remainder of the half cycle. This voltage drop occurs because the inductance of the core drops sharply when the core becomes saturated. The curve 28 illustrates the output voltage for an even larger fault current. With this larger fault current, saturation occurs more quickly, and the output voltage drops at an earlier time in the half cycle.

The ground fault protective system illustrated in FIG. 1 is a ground fault indicator of the flux storage type described in copending application Ser. No. 18,158, filed Mar. 10, 1970 and assigned to the assignee of the present invention. This system includes flux storage means 31 connected to the secondary winding 19 of the differential transformer and readout means 32 connected to the flux storage means. The flux storage means includes a memory core fabricated of a material having a high magnetic permeability, and the readout means can comprise a conventional pulse generator which delivers a continuous train of readout current pulses to the memory core. The protective system also includes a detector 33 connected to the tertiary winding 21 of the differential transformer and adapted for receiving the signals which are read out of the flux storage means. The output of the detector is connected to an indicator 34 which includes means, such as a lamp, for indicating the occurrence of a ground fault. In a ground fault interrupting system, the output of the detector could be applied to a circuit breaker or other type of current interrupter connected for interrupting the flow of current in the distribution system.

Operation of the system illustrated in FIG. 1 can now be described briefly. In the absence of a ground fault, the current flowing between the source 10 and the load 11 through the conductors 12–14 is balanced, and no voltage is induced in the secondary winding 19. Thus, no signal is delivered to the flux storage means, and no signal is read therefrom by the readout pulses.

Upon the occurrence of a ground fault, the current in the conductors 12–14 is no longer balanced, and a fault signal is induced in the secondary winding 19. This signal is stored in the memory core in the flux storage means, and read therefrom by the readout pulses. The signal from the memory core is coupled back through the secondary winding 19, the toroidal core 18, and to the tertiary winding 21 to the detector 33. The detector delivers a signal to the indicator 34 which gives a warning of the occurrence of the ground fault. As long as the ground fault current remains below the level which causes saturation of the core 17, the voltage induced in the secondary winding 19 varies sinusoidally, and the system operates normally. When the fault current is large enough to produce saturation, the reduction in the output voltage enables the readout pulses to be effective over the latter part of each half cycle. Without this decrease, the output voltage produced by large fault currents could rise to levels which would prevent the readout pulses from reading the stored signals out of the storage means.

FIG. 3 illustrates an embodiment of the invention which is generally similar to that shown in FIG. 1, but having a coupling transformer 36. In this embodiment the toroidal core 18 of the differential transformer is formed to include to regions 37 of reduced cross-sectional area. Each of these regions is formed by a V-shaped groove which extends around the small perimeter of the toroidal core.

The coupling transformer 36 includes a toroidal core 38 which is fabricated of a material having a high magnetic permeability. This transformer has an input winding 39 having a plurality of turns wound upon the core 38 and connected to the secondary winding 19 of the differential transformer. This transformer also includes windings 41 and 42 which are connected to the readout means 32 and detector 33, respectively. In this embodiment, the flux storage means comprises a memory core 43 connected to the core of the coupling transformer by means of a single turn coupling link 44.

The toroidal core 38 of the coupling transformer 36 is formed to include a region 46 of reduced cross-sectional area. This region limits the saturation level of the core 38 so that this core provides a further limitation upon the level of the signal delivered to the memory core 43. If desired, additional saturable cores can be coupled intermediate the differential transformer and the coupling transformer to provide still further limitation of the level of the fault signal.

Operation of the embodiment illustrated in FIG. 3 is generally similar to that of the embodiment illustrated in FIG. 1. Here, however, both the fault signal and the readout pulses are applied to the memory core 43 through the coupling transformer 46. Likewise, the fault signals which are read out of the core 43 are applied to the detector 33 through the coupling transformer 46 and the winding 42. Since both the differential transformer and the coupling transformer have saturable cores, the core with the lower level of saturation will be saturated first, reducing the level of the signal applied to the other transformer. With fault currents of sufficient magnitude, the other transformer core is also saturated, thus further reducing the level of the signal applied to the memory core 43.

It is apparent from the foregoing that a new and improved ground fault protective system has been provided which includes means for limiting the level of signals produced by fault currents. In a flux storage type of protective device, this limitation prevents large fault signals from overriding the readout or drive pulses, and it also prevents large fault currents from damaging the system. While only the presently preferred embodiments have been described herein, as will be apparent to those familiar with the art, certain changes and modifications can be made without departing from the scope of the invention as defined by the following claims.

I claim:

1. In a ground fault protective device, ground fault sensing means for monitoring the flow of current in a power distribution system having a plurality of conductors carrying current between a source and a load, one of said conductors being connected to ground at its source end, said ground fault sensing means being adapted for producing a ground fault signal when the current flowing from the source to the load is not equal to the current flowing back to the source through the conductors of the distribution system, flux storage means for storing the fault signal in the form of a magnetic flux signal, readout means connected for applying a drive signal to said storage means for reading the stored flux signal out of said storage means, and saturable inductor core means coupled to the output of said sensing means for limiting the level of the fault signal delivered to the flux storage means to a predetermined level.

2. A ground fault protective device as in claim 1 wherein said saturable core means has a saturation level such that the level of said fault signal is substantially less than the level of said drive signal.

3. A ground fault protective device in claim 1 wherein said saturable core means comprises a core of material having a high magnetic permeability and forming a closed magnetic path having a substantially uniform cross-sectional area throughout most of its length, said area being reduced for a small portion of said length to limit the saturation level of said core.

4. A ground fault protective device as in claim 1 wherein said core is a toroidal core having at least one region of reduced cross-sectional area.

5. A ground fault protective device as in claim 1 wherein said saturable core means is the core of a coupling transformer connected intermediate said ground fault sensing means and said flux storage means.

6. A ground fault protective device as in claim 1 wherein said ground fault sensing means comprises a differential transformer having a plurality of primary windings connected in series with the conductors of said distribution system, a secondary winding in which the fault signal is induced, and a toroidal core coupling said primary and secondary windings, said core forming the saturable core means which limits the level of the fault signal delivered to said storage means.

7. A ground fault protective device as in claim 6 wherein said toroidal core is formed to include a region of reduced cross-sectional area for limiting the saturation level of the core.

8. A ground fault protective device as in claim 6 together with at least one additional saturable core intermediate said differential transformer and said storage means and serving to further limit the level of said fault signal.

9. In a ground fault protective device of the type having ground fault sensing means for monitoring the flow of current in a distribution system having a plurality of conductors carrying current between a source and a load, said ground fault sensing means being adapted for producing a fault signal when the current flowing to the load is not equal to the current flowing back to the source through the conductors, the improvement comprising a saturable magnetic core associated with the ground fault sensing means for limiting the level of the fault signal, said core being fabricated of material having a high magnetic permeability forming a closed magnetic path having a substantially uniform cross-sectional area throughout most of its length, said area being reduced for a small portion of said length to limit the saturation level of said core.

10. A ground fault protective device as in claim 9 wherein said saturable core is a part of said sensing means.

11. In a ground fault protective device of the type having ground fault sensing means for monitoring the flow of current in a distribution system having a plurality of conductors carrying current between a source and a load, said ground fault sensing means being adapted for producing a fault signal when the current flowing to the load is not equal to the current flowing back to the source through the conductors, the improvement comprising a saturable magnetic core associated with the ground fault sensing means for limiting the level of the fault signal and an additional saturable core coupled to the first named core for further limiting the level of said signal.

12. A ground fault protective device as in claim 9 wherein said saturable core is a part of a coupling transformer connected to said ground fault sensing means.

* * * * *